United States Patent [19]

Braeger

[11] Patent Number: 4,825,510

[45] Date of Patent: May 2, 1989

[54] APPARATUS FOR FILLETING FISH

[75] Inventor: Horst Braeger, Lübeck, Fed. Rep. of Germany

[73] Assignee: Nordischer Maschinenbau Rud. Baader GmbH and CO KG, Lubeck, Fed. Rep. of Germany

[21] Appl. No.: 219,588

[22] Filed: Jul. 15, 1988

[30] Foreign Application Priority Data

Jul. 18, 1987 [DE] Fed. Rep. of Germany ....... 3723860

[51] Int. Cl.$^4$ .................. A22C 25/16; A22C 25/08
[52] U.S. Cl. ........................................................ 17/57
[58] Field of Search .............................. 17/57, 56, 52

[56] References Cited

U.S. PATENT DOCUMENTS

| 4,336,634 | 6/1982 | Braeger | 17/57 |
| 4,630,334 | 12/1986 | Evers et al. | 17/56 |

*Primary Examiner*—Willie G. Abercrombie
*Attorney, Agent, or Firm*—Thomas R. Morrison

[57] ABSTRACT

The invention relates to an apparatus for filleting fish rumps/bodies, particulrly fish with a short abdominal cavity. This apparatus is characterized by the arrangement of a vertical guideway formed from belly and back guides, along which are provided belly and back filleting knives axially displaceable against spring tension. The belly filleting knives are positioned upstream of the back filleting knives when seen in the fish passage direction, the back filleting knives intruding between the belly guides under spring tension. If desired, the apparatus can be provided with a known rib scraping device. When this is used, an auxiliary conveyor aiding the advance of the fish is provided between the belly guides.

12 Claims, 2 Drawing Sheets

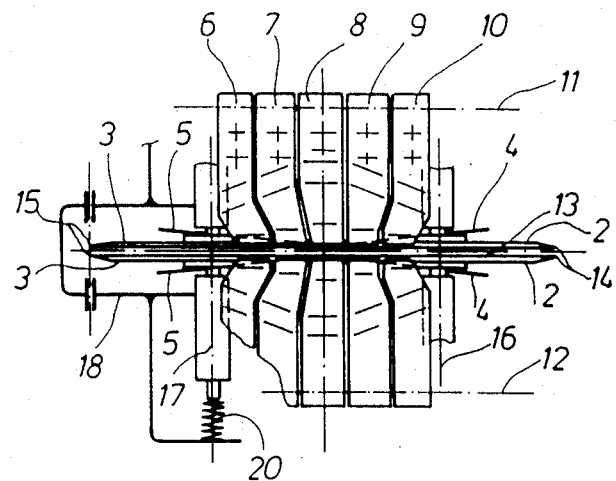
Fig. 2
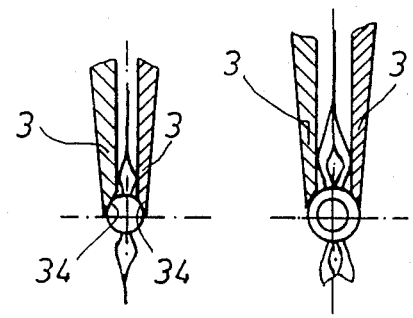
Fig. 7
Fig. 6
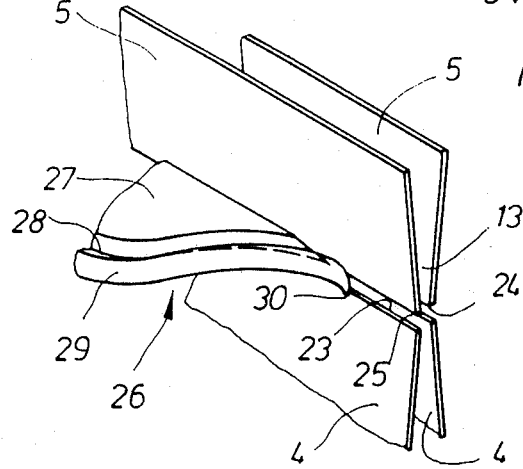
Fig. 5

APPARATUS FOR FILLETING FISH

BACKGROUND OF THE INVENTION

1. Field of the Invention

The present invention relates to an apparatus for filleting fish bodies (rumps), particularly fish with a short-grown abdominal cavity or an abdominal cavity which has been shortened to a small residue or completely removed by corresponding cutting action during decapitating, with pairs each of revolvingly driven abdomen or belly filleting knives and back filleting knives, as well as belly and back guides, respectively, which guide pairs arranged in the planes of the knife pairs and leave between each other a gap for the passage of the belly or back spokes, on the one hand, and among a lateral gap, on the other.

2. Prior Art

German Patent No. 23 50 561 discloses an apparatus for filleting flat fish, in which the processing takes place when the fish pass tools arranged along a vertical path. In this apparatus, conveying disks are arranged downstream of opposing filleting knives and convey the fish bodies, by intruding into the belly and back filleting cuts made and engaging the flanks of the belly and back spokes.

This design was based on a development forming the subject matter of DE-OS No. 22 21 269 and aiming at providing an inexpensive apparatus, in which the conveying of the fish firstly was left to gravity and then additionally to the friction torque between the fish and the filleting knives, and in which it was attempted to make do with a simple, additional auxiliary conveyor engaging on the outside of the fish. As it was soon found, this concept could not be realized, because the accelerating energy imparted to the fish by the filleting knives was not sufficient to complete the filleting process.

The stimulation to this procedure resulted from British Patent No. 597 235, which discloses a conveying means provided in a filleting machine and which comprises a pair of conveying disks facing a belly filleting means and whose task it is to speed up again a fish briefly prevented from forward movement by a hook-shaped knife at the tail end when, following the separation of the fillets in the tail area, said hooked-shaped knife is moved out of the fish path. For this purpose the conveying disks inserted in the already produced back filleting cuts are designed to grip on their periphery and inner flanks. As tests have shown, this does not permit a reliable advance of the fish.

OBJECTS OF THE INVENTION

The main object of the present invention is to provide a fish filleting apparatus of high efficiency, which has a compact construction. Further essential objects of the present invention are to provide such apparatus which can be operated easily and manufactured at comparatively low cost.

SUMMARY OF THE INVENTION

According to the invention, these objects are achieved in an apparatus comprising pairs each of revolvingly driven abdomen or belly filleting knives and back filleting knives, as well as belly and back guides, respectively, which guide pairs arranged in the planes of the knife pairs and leave between each other a gap for the passage of the belly or back spokes, on the one hand, and among a lateral gap, on the other by arranging the apparatus such that the pair of belly filleting knives is positioned upstream of the pair of back filleting knives when seen in the fish passage direction, that the guiding edges of the belly guides facing the back guides are tangential to the circumferential cutting edges of the belly filleting knives, that the circumferential cutting edges of the back filleting knives intrude between the belly guides and are mounted to be swung out of the same radially, that the belly and back filleting knives each are constructed so as to be urged apart axially against the tension of a spring, and that the circumferential cutting edges of the belly and back filleting knives are provided with bevels at least on their flanks facing each other.

The resulting advantages are in particular based on the fact that, apart from the reliable conveying of the fish bodies, a high output can be achieved due to the clamping action of the belly and back filleting knives on the belly and back spokes, because the cutting planes of said knives extend directly along the flanks of the belly and back spokes, without there being any risk of cutting into the same. According to an advantageous modification of the apparatus according to the invention, in which the belly guides and the back guides, each, with their front guidance portions, are associated with the outer flanks of the belly or back filleting knives, whilst keeping free a portion of the circumferential cutting edges which opposes the arriving fish, the belly and back guides can be maintained under spring tension against the outer flanks of the belly or back filleting knives and are constructed so as to be urged apart therewith.

The apparatus can also be used for processing fish bodies having an abdominal cavity, if it is equipped with known scraping tools, which are associated with the guiding edges of the back guides, which guiding edges face the belly guides, and which is characterized in that between the belly guides there is provided a driven auxiliary conveyor with entrainers projecting up to between the back guides and having a spacing or pitch at least corresponding to the length of the largest fish to be processed. A non-timed feeding of the apparatus is possible, if the entrainers of the auxiliary conveyor are constructed so as to be deflectable or to yield in the fish conveying direction. For utilizing gravity during the passage of the fish through the apparatus, the guideway thereof can be vertically oriented, the back filleting knives being held intruded between the belly guides by means of the tension of a spring.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

FIG. 2 shows a plan view of the apparatus with a view of the guide flaps in the feeding area;

FIG. 3 shows a partial longitudinal section through the apparatus along the fish path;

FIG. 4 shows a cross-section through the filleting knives;

FIG. 5 shows an axonometric partial view of the scraping tool;

FIG. 6 shows a partial cross-section through the back filleting knives in the phase of processing the tail region of a fish;

FIG. 7 shows a partial cross-section corresponding to FIG. 6 in the phase of processing an area of the fish in the vicinity of the abdominal cavity end.

DETAILED DESCRIPTION OF THE PREFERRED EMBODIMENT

Figure 1:
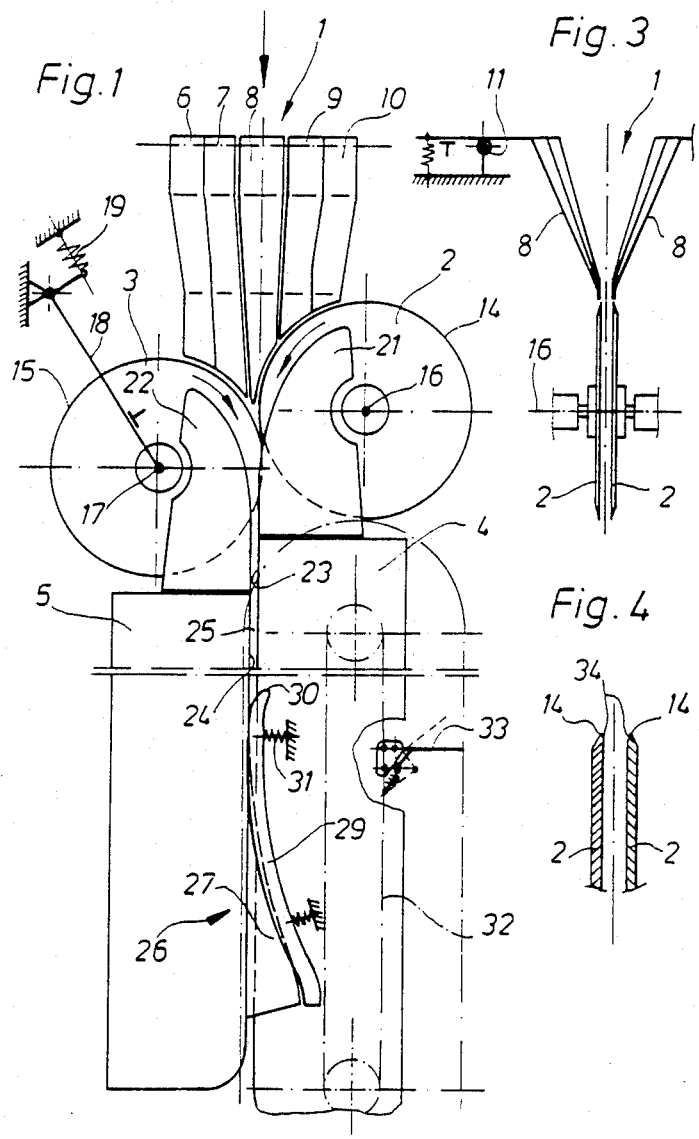
FIG. 1 shows a side view of the apparatus according to the invention in a simplified representation.

A filleting apparatus according to the invention is housed in a not shown frame and comprises as essential components a feeding hopper 1 formed by a set of guide flaps, pairs of belly and back filleting knives 2 and 3, respectively, arranged below the hopper and pairs of belly and back guides 4 and 5, respectively, following the knives. The set of guide flaps forming the feeding hopper 1 comprises several, e.g. five pairs of symmetrically arranged guide flaps 6 to 10, which are mounted pivotably about horizontal axes 11, 12 and are interconnected in known but not shown synchronously displaceable manner. They are held against one another by spring tension, so that at their lower ends a parallel slot 13 having a width of a few millimeters is formed. The lower ends of the guide flaps 6 to 10 directly face the circumferential cutting edges 14, 15 of the belly or back filleting knives 2, 3. According to FIG. 1 they are shaped in such a way that they follow the circular contour of the belly and back filleting knives 2, 3. Each of the latter is mounted independently and driven to rotate in an appropriate way. The spindles 16 of the belly filleting knives 2 are fixed to the frame and the spindles 17 of the back filleting knives 3 are mounted on a rocker arm 18, which, by means of a spring 19, is kept swung-in against a stop in the path of the fish. Each of the belly and back filleting knives 2, 3 is, as shown in FIG. 2, axially displaceable and is mounted so as to be displaceable out of the fish path counter to the tension of a spring 20. The arrangement thereof is such that the belly filleting knives 2, when seen in the working direction of the apparatus, are mounted upstream of the back filleting knives 3 and that their circumferential cutting edges 14, 15 revolve while leaving limited reciprocal spacing. The belly and back guides 4, 5 are arranged in known manner in the planes of the outer flanks of belly and back filleting knives 2, 3 and cover the outer flanks thereof with guide portions 21, 22, which with flexible connection pass into the belly and back guides 4, 5. The guiding edges 23 of the belly guides 4 facing the back guides are oriented tangentially with respect to the circumferential cutting edges 14 of the belly cutting knives 2, whilst the guiding edges 24 of the back guides 5 face the guiding edges 23 of the belly guides 4, whilst leaving a lateral gap 25.

By incorporating a scraping tool 26, the apparatus can also be made suitable for processing fish bodies still having the abdominal cavity. In accordance with FIG. 5, one scraping knife 27, each, is then associated with each guiding edge 24 of the back guides 5. They form parts of the circumferential surface of an imaginary hollow prism with an approximately elliptical cross-section adapting to the abdominal cavity shape of the fish. The cross-sectional plane of this elliptical cross-section through the long axis coincides with the plane of symmetry of the belly and back guides 4, 5, while its longitudinal axis is parallel to the guiding edges 23, 24 of the belly and back guides 4, 5, whereas which the guiding edges 23 of the back guides 5 form surface lines with respect to this elliptical cross-section. The cutting edge 28 of each scraping knife 27 on the circumferential surface of said hollow prism runs along a steep helix line in such a way that the cutting edges 28 start to diverge at the outer flanks of the back guides 5 when seen in the working direction of the apparatus. Whilst leaving a gap, one counter-member or -support 29, each, faces the two cutting edges 28 of the scraping knives 27 and is adapted thereto. Said counter-member 29 has a downwardly bent tip 30 on its end directed counter to the conveying direction. Each counter-member 29 is held against a not shown stop by the tension of springs 31 such that the tip 30 is located in the region of the flanks of the belly guides 4. The assembly containing the scraping tool 26 also comprises a driven auxiliary conveyor 32 to be arranged between the belly guides 4 and having entrainers 33 projecting upto between the back guides 5, the spacing or pitch of which entrainers at least corresponds to the !length of the largest fish to be processed. In the conveying direction of auxiliary conveyor 32, the entrainers 33 are arranged so as to be displaced or deflected against spring tension.

The apparatus according to the invention has the following function:

A fish body to be filletted is fed into the feeding hopper 1 with its tail leading and the plane of symmetry parallel to the slot 13. When the tail fin of the fish passes through the slot 13 of the guide flaps 6 to 10, the belly filleting knives 2 make a cut on either side of the belly spokes up to the centre of the flanks of the vertebral column (spine). The guide portions 21 which, like the guide portions 22, are sharpened in the entrance area, so as to be able to collect the cut free fillet meat without resistance, first penetrate into said cuts. As a result of the staggered arrangement of the back filleting knives with respect to the belly filleting knives 2, the back knives come into cutting action in the fish later. As a result of the fact that in their basic position the back filleting knives 3 intrude between the guide portions 21, the cuts produced on either side of the back spokes follow the belly filleting cuts, i.e. there is initially directly a complete separation of the fillets. The belly and back filleting knives 2, 3 are so closely set in their starting position that the spine which becomes increasingly thick towards the fish head end, in particular urges apart the back filleting knives 3 counter to the tension of the springs 20 whilst carrying with it the guide portions 22 of the back guides 5.

As the filleting process proceeds, there is now a displacement of the back filleting knives 3 counter to the action of the spring 19, which is brought about in that the bevels 34 of the back filleting knives 3 start to be supported on the shoulders of the vertebrae, as shown in FIGS. 6 and 7. Approximately simultaneously, the knife pairs start to axially move apart with respect to one another, because the thickness of the belly and back spokes also increases. A conveying engagement on the spine structure results, which is brought about through the frictional contact between the belly or back spokes and the flanks of the knives, as well as between the bevels 34 and the shoulders of the vertebrae.

As a result of the conveying thus safeguarded, the abdominal cavity end finally arrives in the region of the filleting tools. While the belly filleting tool 2 subsequently passes through the abdominal cavity without effect, the back filleting knives 3 when processing a fish with the abdominal cavity removed, i.e. with the spine cut out in said area, pivot back into the basic position, the feeding or conveying engagement being maintained by the clamping engagement of the knives on the bone strip containing the back spokes.

In the case of fish with a short abdominal cavity or an abdominal cavity residue, the spine or the lateral vertebral extensions or ribs effect that the bevels 34 of the back filleting knives 3, as stated hereinbefore, act as support surfaces with the effect that the back filleting knives 3 are guided to pass over the ribs or lateral vertebral appendages (extensions), which are, at the most, cut-touched The scraping tool used in the embodiment in this case ensures a severing of the finally still remaining connection between the fillets and the ribs, said severing cuts following on to the back filleting cuts and bringing about the complete detachment of the fillets. In this process, the lateral vertebral appendages or the ribs pass over the tips 30 of the counter-members 29 of the scraping tool 26 while displacing these members, so that the scraping knives 27 with their cutting edges 28 are able to separate the muscular substance from these skeletal parts, too, whilst the displacement of the counter-member 29 takes place. The advance required during this process is produced by the auxiliary conveyor 32, one of whose entrainers 33 slidingly engages the fish by its head end to push it. When the fish meets an entrainer 33, the latter is displaced as a result of the backward loading. When the conveying through the belly and back filleting knives 2, 3 becomes ineffective, the fish rests in its position until an entrainer 33 appears, which is able to engage behind the fish head end. In order to improve the certainty of the initial cut following the feeding of the fish into the feeding hopper 1, it is possible to provide a mechanism by means of which the guide flaps 6 to 10 can be tilted or folded outwardly manually and synchronously, a staggered operation also being possible to maintain the centring function of the feeding hopper 1.

What is claimed is:

1. An apparatus for processing bodies of decapitated fish having at least a vertebral column, back and belly spokes extending therefrom, and an abdominal cavity which has been pre-processed during decapitation of said fish by at least one of an opening, shortening and complete cutting-off action to obtain at least a relatively short length, said apparatus defining a guideway for said fish in a fish passage direction and including, arranged along said guideway, pairs, each of revolving driven belly filleting knives, back filleting knives, belly guides and back guides, respectively, which knives are driven to revolve and define circumferential cutting edges thereon, and which guide pairs are arranged in the planes of said knife pairs and leave between the guides of each pair a gap for the passage of said belly or back spokes, on the one hand, and between said pairs a lateral gap, on the other, wherein said pair of belly filleting knives is positioned upstream of said pair of back filleting knives when seen in said fish passage direction;

said belly guides have guiding edges thereon facing said back guides being arranged tangentially to said circumferential cutting edges of said belly filleting knives;

said circumferential cutting edges of said back filleting knives intrude between said belly guides and are mounted to be swung out of said intruding position radially;

said belly and back filleting knives, each, are arranged so as to be urged apart axially against the tension of a spring; and said circumferential cutting edges of said belly and back filleting knives are provided with bevels at least one of the flanks formed on said knives and facing each other.

2. An apparatus as claimed in claim 1, wherein said belly guides and said back guides, each, define front guiding portions, which portions are associated with outer flanks formed on said belly and back filleting knives, whilst leaving free a portion of said circumferential cutting edges, said left free portion opposing said fish when arriving in the region of said knives, and wherein said belly and back guides are each held under spring tension against said outer flanks of said belly or back filleting knives and are arranged so as to be urged apart therewith.

3. An apparatus as claimed in claim 1, wherein scraping knives for scraping off muscular substance from at least one of ribs and lateral vertebral appendages included in said fish, which scraping knives are associated with said guiding edges of said back guides, which guiding edges face said belly guides, and wherein driven auxiliary conveyor means are arranged between said belly guides, which conveyor means include entrainers projecting up to between said back guides and having a spacing from each other at least corresponding to the length of the largest fish to be processed.

4. An apparatus as claimed in claim 2, wherein scraping knives for scraping off muscular substance from at least one of ribs and lateral vertebral appendages included in said fish, which scraping knives are associated with said guiding edges of said back guides, which guiding edges face said belly guides, and wherein driven auxiliary conveyor means are arranged between said belly guides, which conveyor means include entrainers projecting up to between said back guides and having a spacing from each other at least corresponding to the length of the !largest fish to be processed.

5. An apparatus as claimed in claim 3, wherein said entrainers are constructed so as to yield in said fish passage direction.

6. An apparatus as claimed in claim 4, wherein said entrainers are constructed so as to yield in said fish passage direction.

7. An apparatus as claimed in claim 1, wherein said guideway is vertically oriented, said back filleting knives being biased in an intruded position between said belly guides.

8. An apparatus as claimed in claim 2, wherein said guideway is vertically oriented, said back filleting knives being biased in an intruded position between said belly guides.

9. An apparatus as claimed in claim 3, wherein said guideway is vertically oriented, said back filleting knives being biased in an intruded position between said belly guides.

10. An apparatus as claimed in claim 4, wherein said guideway is vertically oriented, said back filleting knives being biased in an intruded position between said belly guides.

11. An apparatus as claimed in claim 5, wherein said guideway is vertically oriented, said back filleting knives being biased in an intruded position between said belly guides.

12. An apparatus as claimed in claim 6, wherein said guideway is vertically oriented, said back filleting knives being biased in an intruded position between said belly guides.

* * * * *